US009065359B2

United States Patent
Iwasa et al.

(10) Patent No.: US 9,065,359 B2
(45) Date of Patent: Jun. 23, 2015

(54) UNNECESSARY VIBRATION DETECTION APPARATUS AND DRIVING CONTROL APPARATUS OF VIBRATION TYPE ACTUATOR

(71) Applicant: CANON KABUSHIKI KAISHA, Tokyo (JP)

(72) Inventors: Takeshi Iwasa, Tokyo (JP); Kenichi Kataoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 13/795,702

(22) Filed: Mar. 12, 2013

(65) Prior Publication Data

US 2013/0241446 A1  Sep. 19, 2013

(51) Int. Cl.
*H01L 41/04* (2006.01)
*H02N 2/14* (2006.01)

(52) U.S. Cl.
CPC ..................................... *H02N 2/142* (2013.01)

(58) Field of Classification Search
CPC .............................. H02N 2/14; H01L 41/042
USPC .................. 318/116; 310/323.02, 323.16
See application file for complete search history.

(56) References Cited

U.S. PATENT DOCUMENTS

| 5,001,404 | A | 3/1991 | Kataoka |
| 5,157,300 | A | 10/1992 | Kataoka et al. |
| 5,539,268 | A | 7/1996 | Kataoka |
| 6,031,316 | A | 2/2000 | Kataoka |
| 6,177,753 | B1 * | 1/2001 | Atsuta ...................... 310/316.01 |
| 6,313,564 | B1 | 11/2001 | Kataoka et al. |
| 6,635,977 | B2 | 10/2003 | Kataoka et al. |
| 6,954,022 | B2 | 10/2005 | Kataoka |
| 7,129,618 | B2 | 10/2006 | Fujimoto et al. |
| 7,514,843 | B2 | 4/2009 | Nagahama et al. |

FOREIGN PATENT DOCUMENTS

| JP | 2-26284 A | 1/1990 |
| JP | 2004-336906 A | 11/2004 |
| JP | 2007-74829 A | 3/2007 |

* cited by examiner

*Primary Examiner* — Karen Masih
(74) *Attorney, Agent, or Firm* — Fitzpatrick, Cella, Harper & Scinto

(57) ABSTRACT

An unnecessary vibration detection apparatus of a vibration type actuator includes an AC voltage generation unit that generates a plurality of AC voltages having a driving frequency; a vibration detection unit that outputs a vibration detection signal of the vibration type actuator; and an unnecessary vibration detection unit that detects an unnecessary vibration component by generating a signal for cancelling the vibration component of the driving frequency in the vibration detection signal by controlling amplitudes of a plurality of AC signals which are used for generating the plurality of AC voltages.

12 Claims, 5 Drawing Sheets

UNNECESSARY VIBRATION DETECTION APPARATUS AND DRIVING CONTROL APPARATUS OF VIBRATION TYPE ACTUATOR

BACKGROUND OF THE INVENTION

1. Field of the Invention

The present invention relates to an unnecessary vibration detection apparatus and a driving control apparatus of a vibration type actuator.

2. Description of the Related Art

An ultrasonic motor that is a kind of vibration type actuator is mounted on a copy machine, interchangeable lenses for cameras, and the like.

In recent years, together with high performance of equipment and low power consumption, high rotation precision, high efficiency and the like have been required.

The ultrasonic motor enables a low-speed high torque driving compared to an electromagnetic motor which is represented by a DC (direct-current) brushless motor. However, some problems exist so as to meet the above requirements.

For example, depending on a contact state between a stator that is configured by an elastic body and a piezoelectric element, and a body to be driven (for example, a rotor that is a moving body), there is a case where movements are not stabilized to generate unnecessary vibrations which causes an abnormal noise, a speed irregularity or an uneven wear.

As a countermeasure to the abnormal noise and the speed irregularity depending on the contact state, Japanese Patent Application Laid-Open No. H02-026284 discloses a driving method of cancelling an audible frequency signal, which separately selects the audible frequency signal of the vibration and thereafter feeds it back. More specifically, a circuit configuration has been proposed, in which only an audible frequency is allowed to pass through by the use of a band pass filter.

However, the vibration type actuator in the related art described above has the following problems.

First, when the band pass filter was configured using a passive element, there was a case in which characteristics of the filter could not be changed, could not be coped with a changed component of the audible sound, and thus an effect only for a predetermined particular component could be obtained.

In addition, a phase delay of the detected signal could not be ignored and thereby such an adverse effect was also present due to insertion of the filter.

In addition, a complex circuit configuration was required and therefore, there is room for improvement in terms of cost.

SUMMARY OF THE INVENTION

An aspect of the present invention relates to an unnecessary vibration detection apparatus of a vibration type actuator capable of tracing and detecting an unnecessary vibration component using a simple configuration.

In addition, there is provided a driven control apparatus of a vibration type actuator including the above-described unnecessary vibration detection apparatus of the vibration type actuator, which is capable of a low cost and stable rotary driving.

According to an aspect of the invention, there is provided an unnecessary vibration detection apparatus of a vibration type actuator, including: an AC voltage generation unit that generates a plurality of AC voltages having a driving frequency; a vibration detection unit that outputs the vibration detection signal of the vibration type actuator; and an unnecessary vibration detection unit that detects an unnecessary vibration component from the vibration detection signal, in which the unnecessary vibration detection unit detects the unnecessary vibration component by generating a signal for cancelling the vibration component of the driving frequency in the vibration detection signal by controlling amplitudes of a plurality of AC signals which are used for generating the plurality of AC voltages.

In addition, according to another aspect of the invention, there is provided a driving control apparatus of a vibration type actuator, including: the unnecessary vibration detection apparatus of the vibration type actuator, wherein a driving of the vibration type actuator is controlled so that an unnecessary vibration component which is detected by the unnecessary vibration detection apparatus is cancelled.

Further features of the present invention will become apparent from the following description of exemplary embodiments with reference to the attached drawings.

Figure 6:
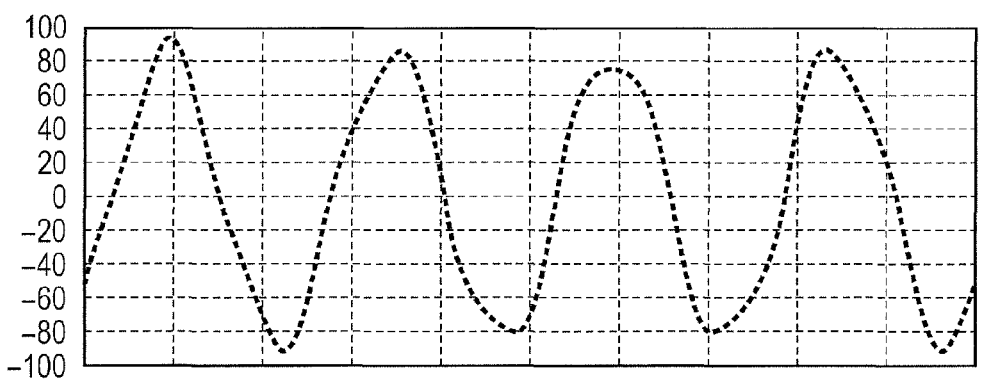
Figure 6:
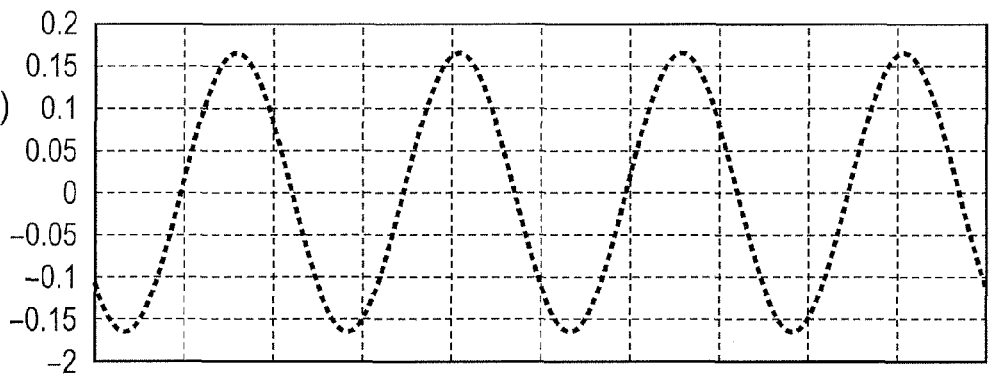
Figure 6:
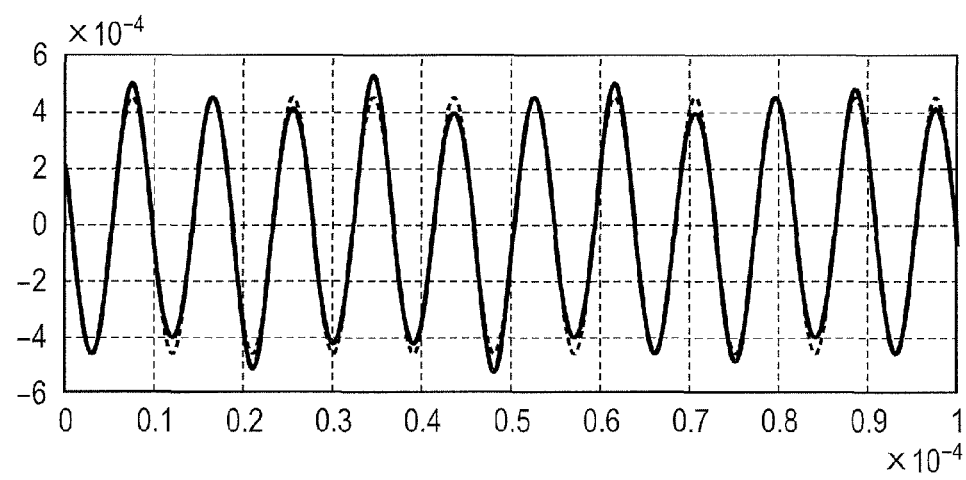

(a), (b) and (c) of FIG. 6 are scatter plot diagrams illustrating operation examples.

Figure 7:
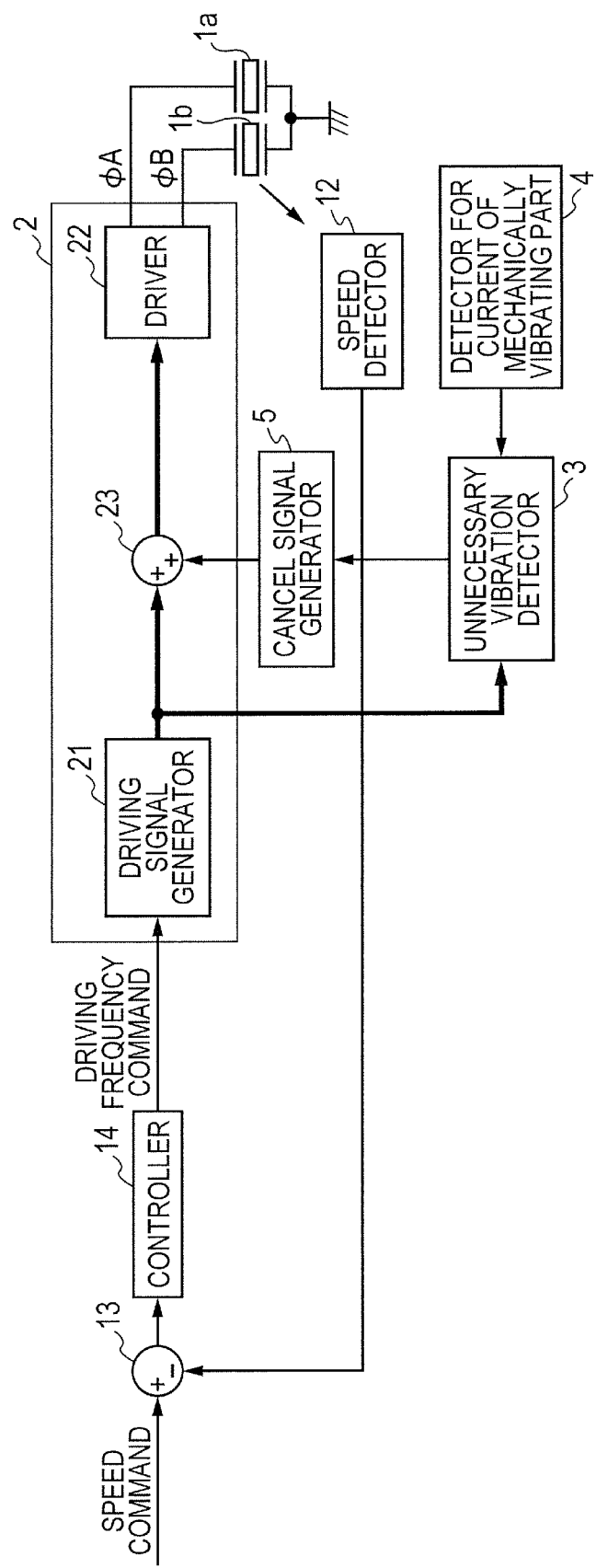

FIG. 7 is a block diagram illustrating a configuration example of a driving control apparatus of the vibration type actuator.

Figure 8:
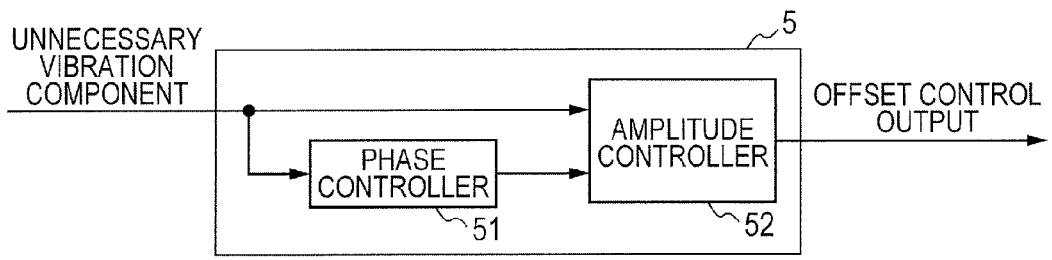

FIG. 8 is a block diagram illustrating a configuration example of a cancel signal generator.

Figure 9:
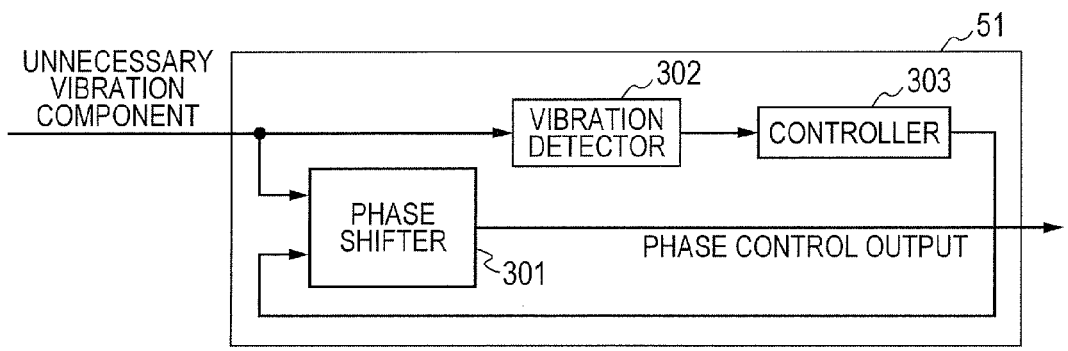

FIG. 9 is a block diagram illustrating a configuration example of the phase controller.

Figure 10:
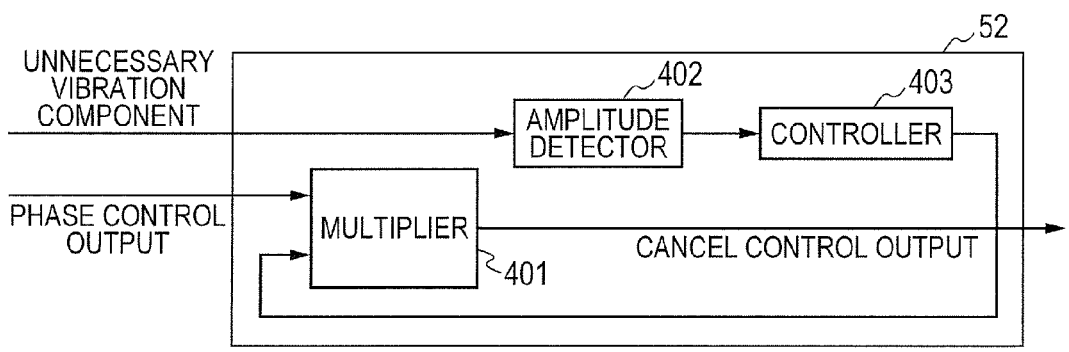

FIG. 10 is a block diagram illustrating a configuration example of an amplitude controller.

DESCRIPTION OF THE EMBODIMENTS

Preferred embodiments of the present invention are now described in detail in accordance with the accompanying drawings. Aspects for embodying the present invention are described with reference to the following embodiments. In addition, the invention is not limited by configurations of the following embodiments.

Embodiment 1

As an embodiment 1, a configuration example of an unnecessary vibration detection apparatus of a vibration type actuator for which the invention is adopted is described.

The vibration type actuator according to the present embodiment is configured so that a vibrating body in which a vibration wave is excited by an application of an AC (alternating-current) voltage and a body to be driven that is brought into contact with the vibrating body or indirectly connected to the vibrating body are relatively moved due to a friction force which is generated by the vibration wave.

For example, the vibration type actuator vibrates the vibrating body which is provided with an elastic body formed of a metal or a ceramic, using a resonance phenomenon of a natural vibration mode of the elastic body, and thus enables the body to be driven which comes into contact with the elastic body to relatively move. As a source of generating an exciting force applied to excite the vibration, a piezoelectric element is mainly used.

The vibration type actuator is able to generate the exciting force by inputting the AC (alternating current) voltage having the same frequency as an exciting frequency.

A structure of the vibration type actuator which uses the piezoelectric element, a rotation principle and a control principle of a rotor are well known techniques. Therefore, in the present embodiment, detailed descriptions are allocated to the assumed use of an annular vibration type actuator having a four-phase electrode configuration of generally ±A phase and ±B phase.

Hereinafter, a configuration of the unnecessary vibration detection apparatus in the vibration type actuator of the present embodiment is described with reference to FIG. 1 to FIG. 6.

Figure 1:
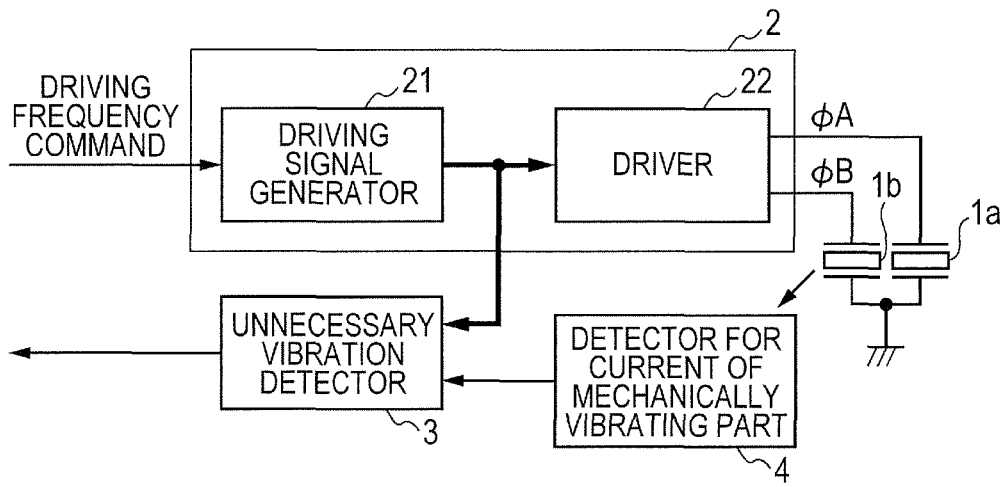
FIG. 1 is a block diagram illustrating a configuration example of an unnecessary vibration detection apparatus in a vibration type actuator.

FIG. 1 illustrates a system of the unnecessary vibration detection apparatus in the vibration type actuator, which detects the unnecessary vibration at a time of a rotary driving of the vibration type actuator according to a driving frequency command from a command unit (not illustrated).

An AC voltage generation unit 2 that generates the four-phase of the AC voltage according to the driving frequency command is configured by a driving signal generator 21 and a driver 22.

The driving signal generator 21 generates a driving signal formed from a sine wave, a cosine wave and each reverse-phase signal thereof according to the driving frequency command.

Then, accordingly, the driver 22 applies the AC voltages φA, φB, −φA and −φB having a phase difference of 90 degrees to the piezoelectric elements 1a, 1b, 1a− and 1b−, respectively.

In addition, for the purpose of simplicity, the piezoelectric elements 1a and 1b and the AC voltages −φA and −φB are not illustrated.

An arrow indicated by a bold line in the drawings represents a vector signal, for example, which illustrates that the driving signal is configured by the above-described four signals corresponding to a four-phase driving.

Figure 2:
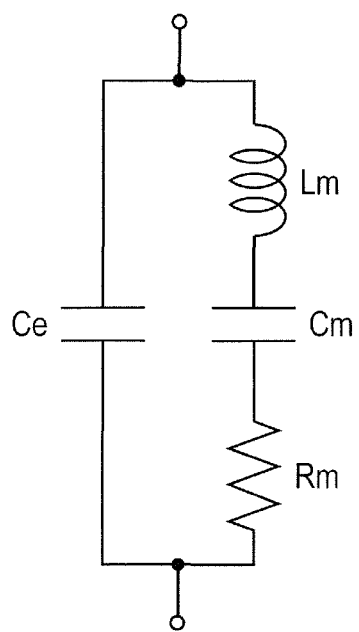
FIG. 2 is an equivalent circuit diagram of the vibration type actuator.

FIG. 2 is an electric equivalent circuit diagram illustrating one-phase of a vibrator.

A capacitor Ce is referred to as an electrically vibrating part and a series circuit of an inductor Lm, a capacitor Cm and a resistor Rm is referred to as a mechanically vibrating part, respectively. The vibrator can be represented by a parallel circuit of the electrically vibrating part and the mechanically vibrating part.

A current flowing through the mechanically vibrating part is referred to as a current of mechanically vibrating part, which corresponds to a component which is in proportion to a vibrating speed of the vibrating body.

In FIG. 1, a detector (vibration detection unit) for mechanically vibrating part detects the current of mechanically vibrating part as a vibration detection signal during the rotation of a rotor (not shown).

The detecting method is a well-known technique. Therefore, the detailed description is omitted. The unnecessary vibration detection apparatus 3 cancels the component corresponding to the driving frequency from the current of mechanically vibrating part using the sine wave and the cosine wave, which comprise the driving signal, and detects the unnecessary frequency component which causes abnormal noise and the speed of irregularity.

In addition, in the present embodiment, a configuration is adopted, in which the current of mechanically vibrating part which is in proportion to the vibration speed is used as a physical quantity related to the vibration. However, for example, a configuration using a detection signal (φS) from a vibration detection sensor in which the piezoelectric element is used, that is, a component which is in proportion to the vibration displacement, may be adopted.

Figure 3:
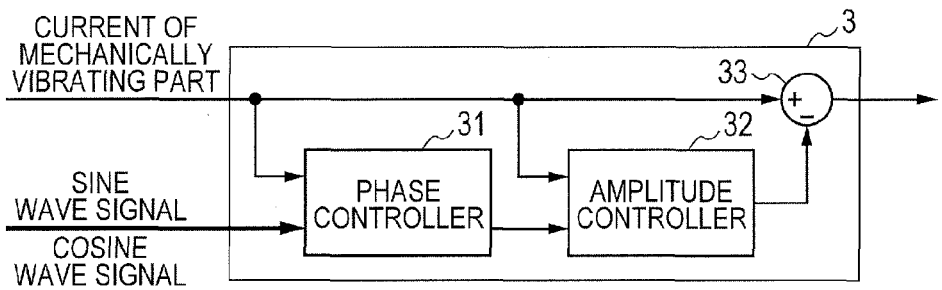
FIG. 3 is a block diagram illustrating a configuration example of an unnecessary type vibration detector.

FIG. 3 is a block diagram illustrating an interior configuration of an unnecessary frequency detector (unnecessary frequency detection unit) 3.

A phase controller 31 performs a phase control using the sine wave and the cosine wave which comprise the driving signal, and then outputs the sine wave having the same phase as that of a driving frequency component of the current of mechanically vibrating part.

Then, the sine wave is controlled by an amplitude controller 32 so that its amplitude is minimized. More specifically, the amplitude controller 32 controls the amplitude of the output signal of the phase controller 31 to be the same amplitude as that of the current of mechanically vibrating part. Finally, in a subtractor 33, the driving frequency component of the current of mechanically vibrating part is cancelled by the output of the amplitude controller 32 being subtracted from the current of mechanically vibrating part and thus the remaining unnecessary vibration component is output to be obtained.

Figure 4:
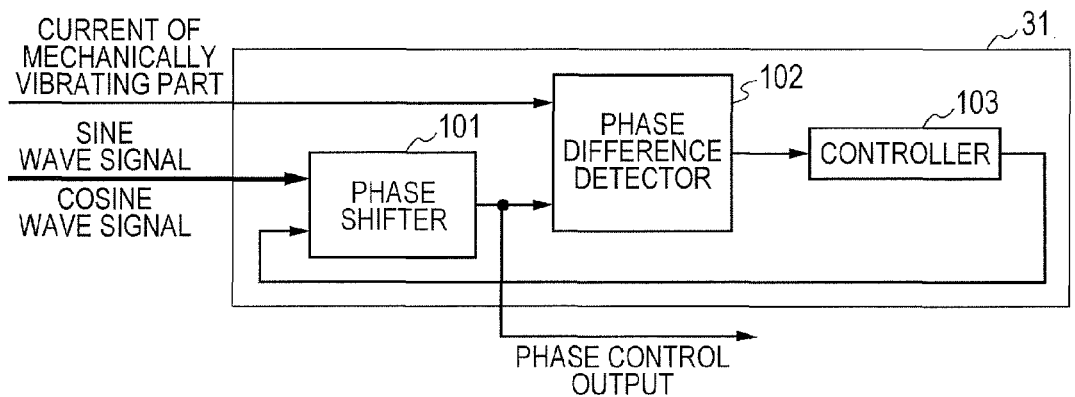
FIG. 4 is a block diagram illustrating a configuration example of a phase controller.

FIG. 4 is a block diagram illustrating an interior configuration of the phase controller 31.

Based on a phase difference between the current of mechanically vibrating part and the phase control output, which is detected by the phase difference detector 102, the controller 103 feeds back a command for controlling the phase of the sine wave to a phase shifter 101 by means of a known PID control and the like.

The phase shifter 101 generates the sine wave having the same phase as that of the current of mechanically vibrating part by controlling the amplitude of the sine wave and the cosine wave for generating a driving signal based on the command, which becomes a phase control output. Furthermore, the phase shifter 101 may generate the sine wave having the same phase as that of the current of mechanically vibrating part by controlling an amplitude of a signal having the antiphase to the sine wave for generating the driving signal or a signal having the antiphase to the cosine wave for generating the driving signal.

In addition, when generating the sine wave having an arbitrary phase, in this embodiment, the nature of the trigonometric functions is used, in which the sine wave having the arbitrary phase can be represented by the sum of the sine wave and the cosine wave which have arbitrary amplitudes. However, of course, the scope of the present invention is not limited thereto.

If the same operation is performed, it may be configured by PLL, for example.

According to the above description, in this embodiment, the phase controller 31 outputs, as the output signal, the sine wave having the same phase as that of the driving frequency component of the current of the mechanically vibrating part, and the amplitude controller 32 controls the amplitude of the output signal of the phase controller 31 to be the same amplitude as that of the current of mechanically vibrating part. Then, the subtractor 33 subtracts the output of the amplitude controller 32 from the current of the mechanically vibrating part to cancel the driving component of the driving frequency from the vibration detection signal. However, the present invention is not limited to the construction. For example, the following construction may be applied. The phase controller 31 outputs, as the output signal, the sine wave having the antiphase to that of the driving frequency component of the current of the mechanically vibrating part, and the amplitude controller 32 controls the amplitude of the output signal of the phase controller 31 to be the same amplitude as that of the current of mechanically vibrating part. Then, the adder adds the output of the amplitude controller 32 to the current of the mechanically vibrating part to cancel the driving component of the driving frequency from the vibration detection signal.

Figure 5:
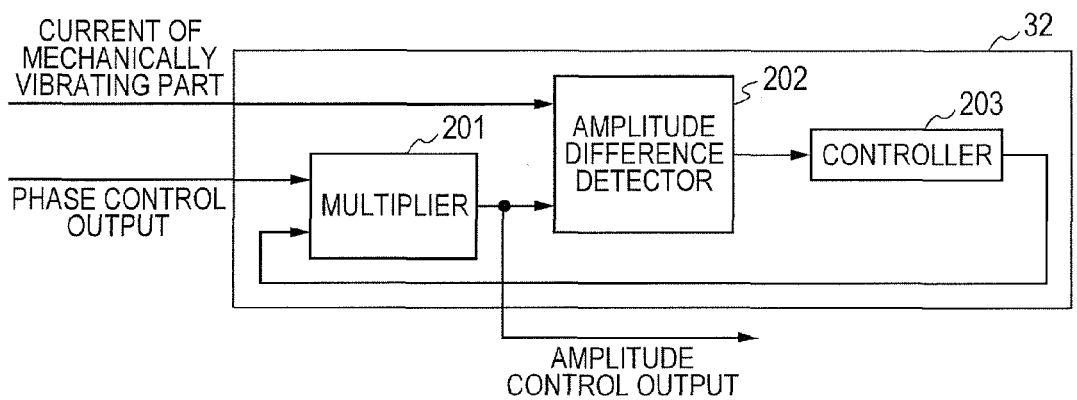
FIG. 5 is a block diagram illustrating a configuration example of an amplitude controller.

FIG. 5 is a block diagram illustrating an interior configuration of the amplitude controller 32.

Based on the amplitude difference between the current of mechanically vibrating part and the amplitude control output, which is detected by an amplitude difference detector 202, a controller 203 feeds back a command for controlling the amplitude of the phase control output that is the output of the phase controller 31 to a multiplier 201 by means of the well-known PID control. The multiplier 201 generates the sine wave having the same amplitude as that of the current of mechanically vibrating part by controlling the amplitude of the phase control output based on the command, which becomes an amplitude control output.

Here, the current of mechanically vibrating part also includes the unnecessary frequency component in addition to the driving frequency. Even though the phase control output of only the driving frequency component is controlled for its amplitude, the controlled amplitude is not strictly the same as that of the driving frequency component of the current of mechanically vibrating part.

However, the unnecessary vibration component has significantly small amplitude. It becomes apparent by the inventors' investigation that sufficient effects can be obtained with regard to the detection of the unnecessary vibration component, that is, the cancellation of the driving frequency component.

FIG. 6 includes scatter plot diagrams of a simulation result with respect to time (second) in the horizontal axis, illustrating examples of various signals which are generated based on the operation described above.

(a) of FIG. 6 illustrates a waveform of a voltage applied to the vibrator, the unit of which is "V" in the vertical axis. Here, since the sine wave of 40 KHz is overlapped with the sine wave of 110 KHz as a disturbance which excites the unnecessary vibration, the waveform is distorted.

(b) of FIG. 6 illustrates a waveform of the current of mechanically vibrating part, the unit of which is "A" in the vertical axis. The reason why the waveform has a shape that is significantly approximate to the sine wave is that the amplitude of the unnecessary vibration component is deviated from a resonance frequency of the vibrator and thereby is significantly decreased compared to the driving frequency component.

(c) of FIG. 6 illustrates an ideal waveform of the unnecessary frequency component with a black thin dotted line and the output of the unnecessary vibration detector with a black thick solid line, respectively.

It is recognized that the waveform has a similar shape and thus the unnecessary vibration component can be almost detected.

As described above, since the phase and the amplitude are controlled using a sinusoidal AC signal for generating the driving signal and the driving frequency component is cancelled from the current of mechanically vibrating part, it is possible to trace and detect the unnecessary vibration even though the unnecessary vibration component of the current of mechanically vibrating part is changed.

Consequently, it is possible to positively and accurately detect the unnecessary vibration using a simple configuration without using a filter.

Embodiment 2

As the embodiment 2, a configuration example of the driving control apparatus of the vibration type actuator is described.

In the embodiment, its basic configuration is similar to that of embodiment 1, other than a speed control loop that feeds back a rotation speed of the rotor and a cancel control loop that cancels the unnecessary vibration. Accordingly, the overlapped description thereof is omitted.

FIG. 7 is a block diagram illustrating a configuration of the driving control apparatus of the vibration type actuator in the present embodiment. The driving control apparatus of the vibration type actuator may include the unnecessary vibration detection apparatus of the embodiment 1.

First, a description will be given with regard to a loop that controls a rotation speed of a rotor in response to a speed command from a command unit which is not illustrated.

The rotation speed of the rotor (not illustrated) is detected by a speed detector 12 such as a rotary encoder. A difference between a speed detection signal and the speed command from the command unit (not illustrated) is calculated by the subtractor 13.

Based on the difference signal, the controller 14 controls the feedback of the frequency (hereinafter, referred to as a driving frequency) of the AC voltage using the well-known PID control and the like.

Hereinafter, an example is described with regard to the cancel control loop that cancels the unnecessary vibration.

A cancel signal generator 5 performs the control so that an output signal from the unnecessary vibration detection apparatus 3 is minimized, and thereby outputs the cancel control output signal.

The output signal is overlapped with the driving signal having a predetermined phase by the adder 23. The above control is performed to suppress the unnecessary vibration component.

Hereinafter, an explanation will be given with regard to an operation of the cancel signal generator 5 using FIGS. 8 to 10. FIG. 8 is a block diagram illustrating a configuration of the cancel signal generator 5.

A signal corresponding to the unnecessary signal component from the unnecessary vibration detection apparatus 3 is input, and then, is passed through a phase controller 51 and thereby shifted, so as to have an appropriate phase. Then, the shifted signal is input to an amplitude controller 52 together with the original signal.

The phase control output signal is controlled by the amplitude controller 52 so that the original unnecessary vibration component is minimized, which results in the cancel control output.

FIG. 9 is a block diagram illustrating a configuration of the phase controller 51.

A controller 303 feeds back the command to a phase shifter 301 so that the amplitude of the unnecessary vibration component which is detected by an amplitude detector 302 is minimized using the well-known PID control and the like.

The phase shifter 301 shifts the phase of the signal of the unnecessary vibration component based on the above-described command, which results in a phase control output.

FIG. 10 is a block diagram illustrating a configuration of the amplitude controller 52. A controller 403 feeds back the command to a multiplier 401 so that the amplitude of the unnecessary vibration component which is detected by an amplitude detector 402 is minimized using the well-known PID control and the like.

The multiplier 401 adjusts the amplitude of the phase control output based on the command described above, which results in the cancel control output. The cancel control output is equivalent to the driving signal enough to cancel the unnecessary vibration component.

As described above, a signal which is obtained by the feedback control is overlapped with the driving signal of the vibrator so as to cancel the unnecessary vibration component, and thereby the unnecessary vibration can be positively suppressed. Therefore, a stable rotation driving of the vibration type actuator may be realized.

Accordingly, the phase and the amplitude of the sinusoidal AC signal which is used in the generation of the AC voltage are controlled to minimize the amplitude of the vibration detection signal of the vibration type actuator, and thus the vibration component of the driving frequency is cancelled from the vibration detection signal. In this manner, it is possible to perform the tracing detection of the unnecessary vibration component with a simple structure.

In addition, it is also possible to realize the driving control apparatus of the vibration type actuator which enables the stable rotation driving with a low cost by performing the feed-back control based on the unnecessary vibration component traced and detected with the above simple structure.

According to an aspect of the invention, it is possible to realize the unnecessary vibration detection apparatus of the vibration type actuator which is capable of tracing and detecting the unnecessary vibration component with a simple configuration.

In addition, it is possible to realize the driving control apparatus of the vibration type actuator which is provided with the unnecessary vibration detection apparatus of the vibration type actuator described above and is able to perform the stable rotation driving with a low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-062299, filed Mar. 19, 2012, and 2013-044336, filed Mar. 6, 2013, which are hereby incorporated by reference herein in their entirety.

What is claimed is:

1. An unnecessary vibration detection apparatus of a vibration type actuator, comprising:
   an AC voltage generation unit that generates a plurality of AC voltages having a driving frequency;
   a vibration detection unit that outputs a vibration detection signal of the vibration type actuator; and
   an unnecessary vibration detection unit that detects an unnecessary vibration component from the vibration detection signal,
   wherein the unnecessary vibration detection unit is configured to generate a signal for cancelling the vibration component of the driving frequency in the vibration detection signal by controlling amplitudes of a plurality of AC signals which are used for generating the plurality of AC voltages, and to cancel the vibration component of the driving frequency in the vibration detection signal to detect the unnecessary vibration component.

2. The unnecessary vibration detection apparatus of a vibration type actuator according to claim 1,
   wherein the unnecessary vibration detection unit includes a phase control unit that controls the amplitudes of the plurality of AC signals, and
   wherein the unnecessary vibration detection unit outputs a sine wave having the same phase as that of a driving frequency component in a vibration detection signal.

3. The unnecessary vibration detection apparatus of a vibration type actuator according to claim 1,
   wherein the unnecessary vibration detection unit comprises:
   a phase control unit that controls the amplitudes of the plurality of AC signals and outputs a sine wave having the same phase as that of a driving frequency component in a vibration detection signal; and
   an amplitude control unit that controls an amplitude of the sine wave which is output from the phase control unit.

4. The unnecessary vibration detection apparatus of a vibration type actuator according to claim 3,
   wherein the unnecessary vibration detection unit further comprises a subtractor that substracts an output signal of the amplitude control unit, which is controlled so that the amplitude of the vibration detection signal is minimized by the amplitude control unit, from the vibration detection signal.

5. The unnecessary vibration detection apparatus of a vibration type actuator according to claim 1,
   wherein the unnecessary vibration detection unit includes a phase control unit that controls the amplitudes of a sine wave or a cosine wave of each of the plurality of AC signals, and
   wherein the unnecessary vibration detection unit outputs a sine wave having an antiphase to that of a driving frequency component in a vibration detection signal.

6. The unnecessary vibration detection apparatus of a vibration type actuator according to claim 1,
   wherein the unnecessary vibration detection unit comprises:
   a phase control unit that controls the amplitudes of the plurality of AC signals and outputs a sine wave having an antiphase to that of a driving frequency component in a vibration detection signal; and
   an amplitude control unit that controls the amplitude of the sine wave which is output from the phase control unit.

7. The unnecessary vibration detection apparatus of a vibration type actuator according to claim 6,
   wherein the unnecessary vibration detection unit further comprises an adder that adds an output signal of the amplitude control unit, which is controlled so that the amplitude of the vibration detection signal is minimized by the amplitude control unit, to the vibration detection signal.

8. The unnecessary vibration detection apparatus of a vibration type actuator according to claim 1,
   wherein the plurality of AC signals comprises a first AC signal and a second AC signal, and
   wherein the unnecessary vibration detection unit controls at least an amplitude of a sine wave as the first AC signal and an amplitude of a cosine wave as the second AC signal.

9. The unnecessary vibration detection apparatus of a vibration type actuator according to claim 1,
   wherein the vibration detection unit is configured to be detectable for a vibration speed of a vibrating body.

10. The unnecessary vibration detection apparatus of the vibration type actuator according to claim 1,
    wherein the vibration type actuator includes a vibrating body where a vibration wave is excited by an application of the plurality of AC voltages and a body to be driven that is brought into contact with the vibrating body or indirectly connected to, and wherein relative movement is effected between the vibrating body and the body to be driven.

11. The unnecessary vibration detection apparatus of a vibration type actuator according to claim 10, wherein relative movement between the vibrating body and the body to be driven is effected due to a friction force which is generated by the vibration wave between the vibrating body and the body to be driven.

12. A driving control apparatus of a vibration type actuator, comprising:

the unnecessary vibration detection apparatus of a vibration type actuator according to claim 1, wherein a driving of the vibration type actuator is controlled so that an unnecessary vibration component which is detected by the unnecessary vibration detection apparatus is cancelled.

* * * * *